Jan. 13, 1959

M. ARDITI 2,868,966

RADIO FREQUENCY RADIO RECEIVER WITH LINE-ABOVE-GROUND DIRECTIONAL COUPLERS AND AUTOMATIC FREQUENCY CONTROL

Filed March 26, 1953

2 Sheets-Sheet 1

INVENTOR
MAURICE ARDITI
BY Percy P. Lantzy
ATTORNEY

INVENTOR
MAURICE ARDITI
BY Percy P. Lantzy
ATTORNEY

United States Patent Office 2,868,966
Patented Jan. 13, 1959

2,868,966

RADIO FREQUENCY RADIO RECEIVER WITH LINE-ABOVE-GROUND DIRECTIONAL COUPLERS AND AUTOMATIC FREQUENCY CONTROL

Maurice Arditi, Clifton, N. J., assignor to International Telephone and Telegraph Corporation, a corporation of Maryland Application March 26, 1953, Serial No. 344,748

1 Claim. (Cl. 250—20)

This invention relates to radio frequency circuits and more particularly to radio frequency directional and hybrid couplers and applications thereof in the radio frequency section of microwave and U. H. F. receivers.

Microwave receiving apparatus heretofore proposed have required, particularly for the high frequency section thereof, expensive and bulky components including waveguides, special frequency couplers, and other structural elements commonly referred to as "microwave plumbing." As technical development has progressed in the use of microwave radio apparatus, such as in short wave radio receivers, radar, direction finding devices, and radio aerial navigation devices, the demand has grown for larger quantities of such apparatus and particularly for less expensive, smaller, and lighter weight microwave equipment.

In my copending application, M. Arditi and P. Parzen, Serial No. 286,764, filed May 8, 1952, now Patent No. 2,774,046, a line-above-ground type of microwave transmission line is disclosed comprising, in one of its simplest forms, two conductors printed or otherwise disposed in substantially parallel relation on opposite sides of a strip of dielectric material a small fraction of a quarter wavelength thick. It is one of the objects of the present invention to provide a radio frequency directional coupler employing the line-above-ground type of transmission line in the construction thereof whereby the degree of coupling between two circuits is accurately controlled without requiring cumbersome and expensive plumbing structure.

Another object of this invention is to provide a relatively simple radio frequency coupler of the hybrid junction type.

Still another object is to provide a crystal mixer circuit employing a hybrid junction of the open line-above-ground type.

A further object of the invention is to provide a radio receiver circuit employing combinations of line-above-ground hybrid junctions and/or directional couplers to replace much of the cumbersome and expensive waveguide plumbing heretofore believed required in the high frequency section of microwave and U. H. F. receiver circuits.

As hereinbefore suggested, one of the features of this invention is the use of an open line-above-ground type of transmission line which may be made by printed circuit technique utilizing a planar conductor in conjunction with a layer of dielectric material on which is printed or otherwise formed line conductors to provide with the planar conductor radio frequency transmission paths. By arranging the line conductors as hereinafter described, directional coupling arrangements and hybrid junctions may be provided for the guidance and transmission of radio frequency signals. The relationship of the line conductors to and from a coupling section may be selected so as to control the degree of coupling as well as to minimize radiation losses.

The above-mentioned and other features and objects of this invention will become more apparent by reference to the following description taken in conjunction with the accompanying drawings, in which.

Figures 1, 2, 3:
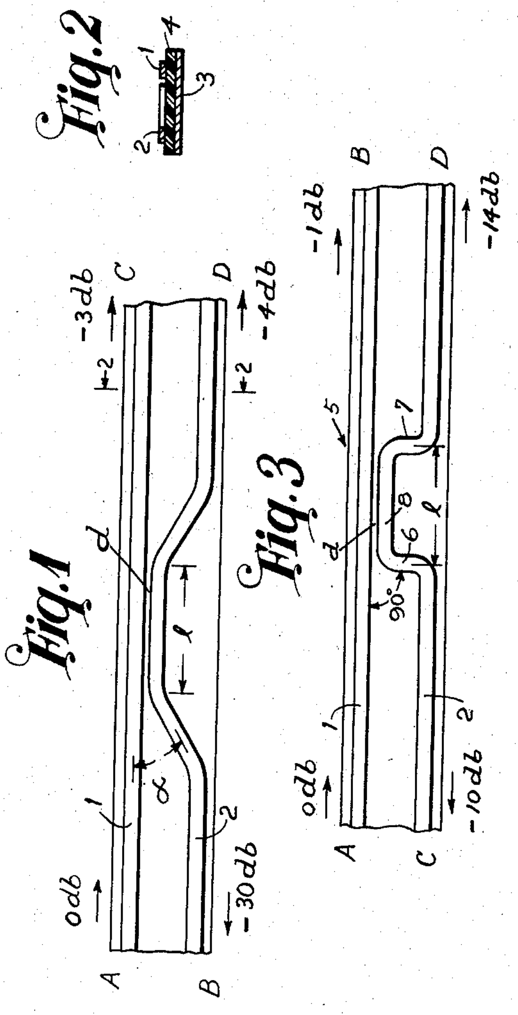
Fig. 1 is a view in plan of a directional coupler in accordance with the principles of this invention.
Fig. 2 is a cross-sectional view taken along line 2—2 of Fig. 1.
Fig. 3 is a view in plan of a coupler construction useful in explaining the advantages of the line configuration shown in Fig. 1.

Referring to Figs. 1 and 2 the directional coupler shown comprises line conductors 1 and 2 and a base or ground conductor 3 with a layer of dielectric material 4 spacing the line conductors in close substantially parallel relation to the planar surface of the ground conductor. The conductive material of lines 1 and 2 and the planar conductor 3 may be applied and/or etched or shaped on a layer of dielectric material, such os polystyrene, polyethylene, quartz, Teflon, fiberglass or laminated fiberglass impregnated with Teflon or other suitable material of high dielectric quality, in accordance with known printed circuit techniques. The spacing of the line conductors with respect to the ground conductor is preferably selected a small fraction of a quarter wavelength of the radio frequency waves propagated therealong, a suitable fraction being in the order of one-tenth to one-fifth of a quarter wavelength.

While it is well-known that if two line conductors are disposed in closely spaced parallel relation for a distance intercoupling or "cross talk" results, I have observed that where the line conductors of a line-above-ground waveguide are disposed in close parallel relation for a given length, the directivity and degree of coupling are functions of the angle between the adjacent leads of the parallel conductors. By way of example, the illustration contained in Fig. 3 represents a coupled section in which the conductors 1 and 2 are brought close together in parallel relation as indicated at 5, this being accomplished by providing right angle bends at 6 and 7 in conductor 2, thereby disposing the interconnecting portion 8 in close spaced relation to the conductor 1. In this model the length $l$ of the portion 8 was 40 millimeters while the spacing $d$ between 8 and 1 was 2 millimeters. Each of the terminals A, B, C, and D were matched to coaxial lines suitably loaded so that the VSWR (voltage standing wave ratio) of each junction looking into a matched load was 1.08 or better. The coupling was about 10 db with a directivity of about 3 db, the measurements being indicated adjacent each lead assuming 0 db for the input lead A.

In contrast to the 90° lead arrangement shown in Fig. 3, a 30° lead arrangement ($\alpha$) for a like parallel section with $d=2$ millimeters was found to have a coupling of about 1 db with a directivity of 26 db with the spacing $d=1$ millimeter the coupling was about 1 db with a directivity of about 28 db. This is illustrated by the values as shown adjacent the terminals of the illustration shown in Fig. 1. The same relative values were observed for the other three terminals regardless to which terminal the input energy was applied. The frequency employed for these tests was between 4400 and 5000 megacycles. These values were found not to change appreciably even where the two dimensions $d$ and $l$ were changed up to a 2 to 1 ratio nor when the frequency was varied between 4400 and 5000 megacycles. The directional coupler thus obtained was found to have a characteristic of a broad band hybrid circuit when the angle $\alpha$ was selected at approximately 30°, for a transmission line wherein the dielectric was fiberglass 1.5 millimeters thick with a line conductor 6 millimeters wide. This angle, however, is a function of the dielectric coefficient, its thickness, the width of the line conductor and the frequency of the wave energy. While directional coupling is obtainable at other angles such as the 90° angle illustrated in Fig. 3, the hybrid characteristic may be lost. By "hybrid circuit" it is herein defined as a directional coupler in which the power applied over input branch A (Fig. 1) splits substantially equally between branches C and D while the power flowing to branch B is practically negligible.

Figure 4:
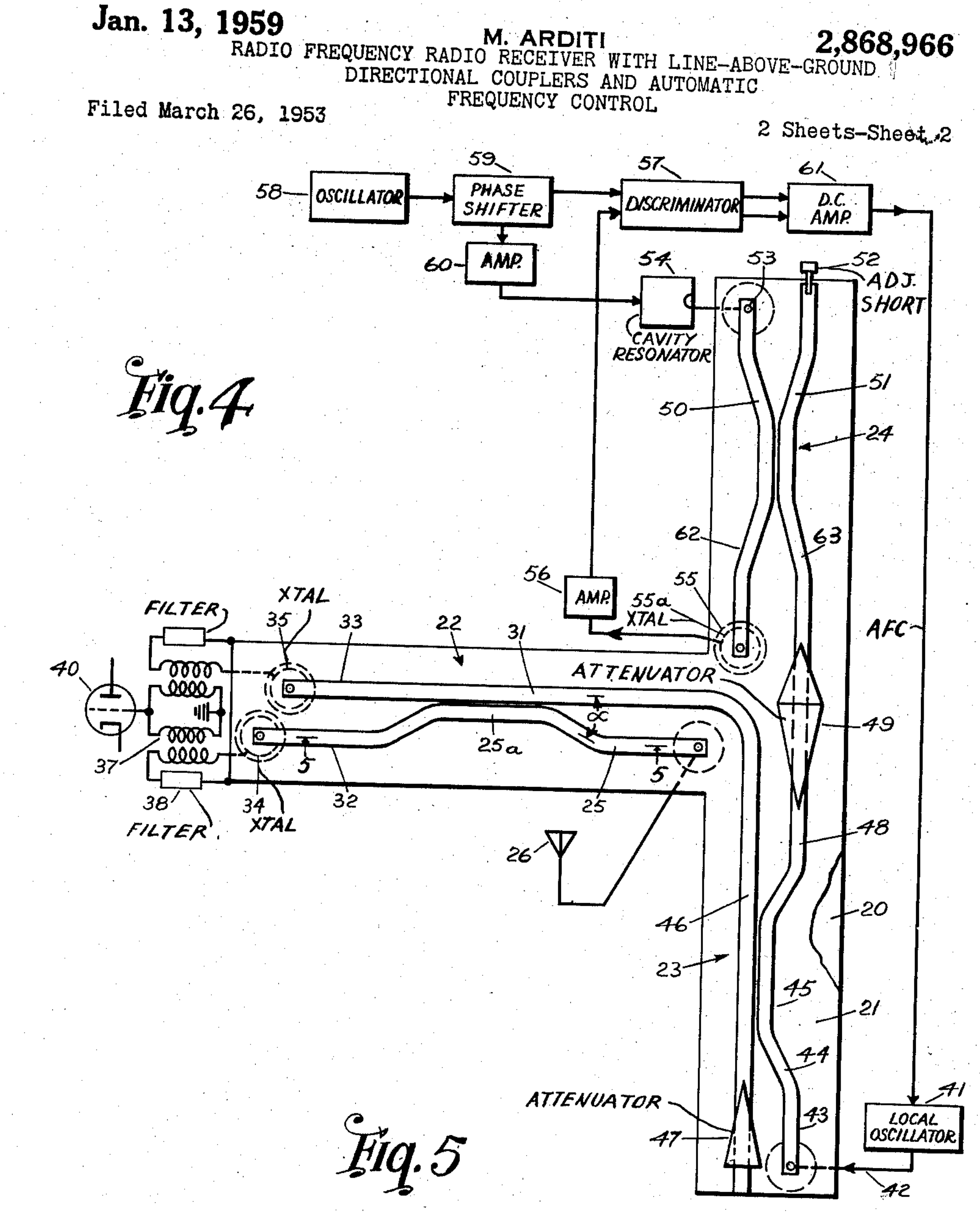
Fig. 4 is a plan view with parts shown in block diagram of the high frequency section of a radio receiver.
Figure 5:
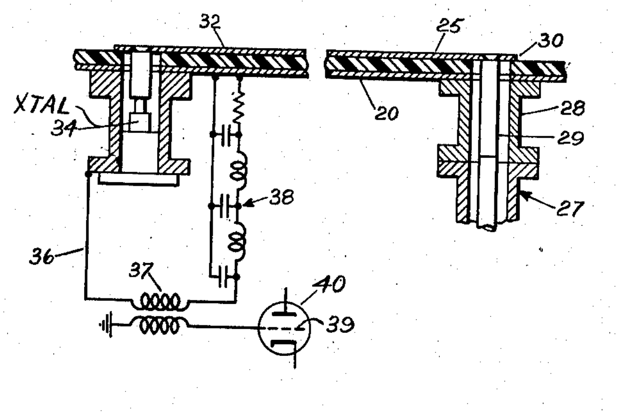
Fig. 5 is a cross-sectional view taken along line 5—5 of Fig. 4 showing a mixer circuit incorporated in the receiver.

Referring to Figs. 4 and 5 of the drawing the high frequency section of a radio receiver for ultra high frequency is illustrated. The radio frequency section is shown to comprise a planar conductor 20, a layer of dielectric material 21 and conductive strip circuitry carried by the layer in parallel relation to the planar conductor, the strip circuitry comprising three hybrid couplers 22, 23, and 24. The first hybrid circuit 22 comprises a line conductor 25 to which is coupled an antenna 26 by means of a coaxial line 27, Fig. 5. The coaxial coupling is brought through the planar conductor by coupling the outer conductor of the coaxial line 27 to the planar conductor 20 and extending the inner conductor 29 through an opening 30 for connection to the line conductor 25. The other line conductor 31 of the hybrid circuit 22 is disposed in parallel relation to a section 25*a* of conductor 25 to function as a hybrid junction. The adjacent leads of the conductors 25 and 31 at both ends of the parallel section are disposed angularly with respect to each other to decrease gradually the coupling therebetween for optimum hybrid operation. The two leads 32 and 33 are coupled to crystal detectors 34 and 35 through the planar conductor as illustrated in Fig. 5. The output of each crystal detector is connected by lead 36 through a coupling transformer 37 to filter 38. The other coil of the transformer 37 is connected to the grid 39 of an amplifier stage 40.

The second hybrid circuit 23 provides a coupling between a local oscillator 41 and conductor 31 of the first hybrid circuit 22. The lead 42 from the local oscillator may comprise a coaxial line or other suitable coaxial coupling connection between the oscillator and the lead 43 of the hybrid circuit 23, the coupling being made similarly as illustrated for the antenna connection 27, Fig. 5. The lead 43 is coupled through an angular portion 44 to a parallel section 45 for directive coupling of oscillator energy to conductor 46 which connects directly with the conductor 31. The conductor 46 is suitably terminated with an attenuator pad 47. The output lead 48 of the conductor 43 may likewise be loaded with an attenuator pad 49.

From the foregoing description of Fig. 4 it will be clear that local oscillator energy may be applied either directly to the line conductor 31 of the hybrid circuit 22 or through the second hybrid circuit 23 as illustrated. Regardless of which way the local oscillator output is coupled to the hybrid circuit 22 it beats with the incoming signals from antenna 26 for application to the crystal mixer 34, 35. The detected output is thereupon applied to the first stage 40 of the usual intermediate preamplifier.

The illustration of Fig. 4 also provides for automatic frequency control, the hybrid circuit 24 being provided for this purpose. One line conductor 50 is provided in parallel relation to a second line conductor 51. The lead 48 of the hybrid circuit 23 is connected past the attenuator pad 49 to the line conductor 51 the other terminal of which is terminated in an adjustable short 52 to plate 20, the short being in the form of a U-shaped clamp. One terminal 53 of line conductor 50 is coupled to a cavity resonator 54 of the diaphragm type such as described in Patent No. 2,462,294, while the other terminal 55 is coupled to a crystal 55*a* which is connected to an amplifier 56. The output of the crystal amplifier is connected to a balanced discriminator 57 to which is also applied the output of an oscillator 58, the output being first passed through a phase shifter 59. The output of the phase shifter is also applied through an amplifier 60 to the cavity resonator 54. The output of the discriminator 57 is applied through a D. C. amplifier 61 in series with the repeller supply of local oscillator 41 for error correction.

It will be noted in connection with parallel section of hybrid 24 that the leads 62 and 63 both angle out with an angle of about 30° therebetween. The total angle may be obtained by angling one conductor only as shown in Fig. 1 and at 22 and 23 whichever may be desired.

The phase shifter adjusts the phase of the reference sine wave output from the oscillator 58 as compared with the phase of the input to the cavity resonator 54 so that there is no discriminator output when the oscillator 41 is oscillating at the center frequency of the cavity 54. The input sine wave to the cavity resonator causes a modulation of the resonant frequency of the cavity resonator 54 about its original resonant frequency, which may also be called the center frequency of the cavity, equal to the frequency of the oscillator 58. If the local oscillator 41 where oscillating at the center frequency of the reference cavity, there would be a minimum output from the crystal 55*a*. However, if the oscillator 41 drifts off the resonant frequency of the cavity 54, the crystal 55*a* output increases and the phase of the crystal output is determined by the direction of the frequency shift of the oscillator 41. The input to the discriminator 57 is the reference sine wave output from the phase shifter 59 and the sine wave output of the crystal 55*a* which is amplified by the amplifier 56. The crystal output varies in amplitude at the rate of the oscillator 58 frequency, and its amplitude is determined by the shifting frequency of the oscillator 41. If the oscillator 41 is at the resonant frequency of the cavity, then the output of the discriminator is zero and the discriminator output increases when the frequency of the oscillator 41 drifts from the resonant frequency of the cavity.

Signal coming from the local oscillator splits between the arms leading to terminals 52 and 53 of this coupler 24. Reflections from the shorted terminal 52 and the modulated reference cavity are mixed in crystal detector 55*a*. The resultant current is amplified and used to unbalance the discriminator 57. The amplitude and phase of the crystal output determine the nature of the unbalance. The relation of the center frequency of the cavity to the frequency of oscillation of the local oscillator determines the sign of the D. C. output of the discriminator. The automatic frequency control is realized by connecting the discriminator output in series with the repeller supply of the oscillator 41.

From the foregoing it will be clear that radio frequency sections of microwave and U. H. F. receivers may be constructed with a simple form of line-above-ground circuitry thereby avoiding the complicated and expensive wave-guide and plumbing heretofore believed necessary. It will also be readily apparent that the intermediate frequency section, as well as the low frequency portion of the receiver, may be mounted upon a planar conductor common to the conductor 20. Furthermore, certain of the radio circuitry may be printed in strip form directly on the layer of dielectric material.

While I have described above the principles of my invention in connection with specific apparatus, it is to be clearly understood that this description is made only by way of example and not as a limitation to the scope of my invention as set forth in the objects thereof and in the accompanying claims.

I claim:

In a receiver, a planar conductor, a first parallel conductor section comprising first and second line conductors and means supporting said line conductors in dielectrically spaced, substantially parallel relation with respect to the plane of said planar conductor whereby each line conductor provides in conjunction with said planar conductor a radio frequency transmission path, said line conductors being disposed throughout a given length in close parallel spaced relation to each other so that each line conductor of said given section lies well within the electromagnetic field of the transmission path of the other, detector means coupled to each of said first and second line conductors at one end of said parallel section, a source of radio frequency signals coupled to the remaining end of said second line conductor, an amplifier, means coupling the outputs of the detector means to said amplifier, a local oscillator, a second parallel line conductor section disposed in dielectrically spaced relation to said planar conductor, one of the line conductors of said second section being connected to said local oscillator and the other line conductor of said second section being coupled to the first conductor of said first section, the remaining end of each of the line conductors of said second section being provided with an attenuator, and further including an automatic frequency control circuit having a third parallel line conductor section disposed in dielectrically spaced relation to said planar conductor, a cavity resonator, means coupling one end of one of the line conductors of said third section to said cavity resonator, said third section having a pair of leads, one for each line conductor thereof, a detector, one of said leads being coupled to said detector and the other of said leads being coupled to the line conductor of said second section to which said local oscillator is coupled, an oscillator, a discriminator, a phase shifter coupling the output of said oscillator to said discriminator and to said cavity resonator to provide a reference signal for said discriminator and to modulate the resonant frequency of said cavity resonator, means coupling the output of said detector to said discriminator to derive a control voltage from said discriminator, and means coupling said control voltage to said local oscillator to control the frequency of said local oscillator.

References Cited in the file of this patent

UNITED STATES PATENTS

| | | |
|---|---|---|
| 2,144,836 | Dietrich | Jan. 24, 1939 |
| 2,410,387 | Mueller | Oct. 29, 1946 |
| 2,468,151 | Willoughby | Apr. 26, 1949 |
| 2,479,537 | Fyler | Aug. 16, 1949 |
| 2,568,090 | Riblet | Sept. 18, 1951 |
| 2,611,040 | Brunetti | Sept. 16, 1952 |
| 2,721,309 | Seidel | Oct. 18, 1955 |

OTHER REFERENCES

Article: "Etched Sheets Serve as Microwave Components," by Barrett, in "Electronics"; June 1952; pages 114–118.